United States Patent [19]
Podiak et al.
[11] 4,193,012
[45] Mar. 11, 1980

[54] SPARK PLUG SEAL

[75] Inventors: Richard S. Podiak, Maumee; LeRoy H. Houghton, Toledo, both of Ohio; Paul E. Rempes, Jr., Royal Oak, Mich.

[73] Assignee: Champion Spark Plug Company, Toledo, Ohio

[21] Appl. No.: 949,572

[22] Filed: Oct. 10, 1978

[51] Int. Cl.[2] ........................ H01T 13/00; H01T 13/20; C04B 35/20

[52] U.S. Cl. .................................... 313/137; 313/118; 106/73.5

[58] Field of Search ............... 313/118, 137; 106/73.5; 123/169 R

[56] References Cited

U.S. PATENT DOCUMENTS

| | | | |
|---|---|---|---|
| 2,020,967 | 11/1935 | Rohde | 264/262 |
| 2,106,578 | 1/1938 | Schwartzwalden et al. | 123/169 |
| 2,367,445 | 1/1945 | Stoltenberg | 65/18 |
| 2,437,205 | 3/1948 | Middleton et al. | 264/61 |
| 2,503,194 | 4/1950 | Cipriani et al. | 313/134 |

*Primary Examiner*—O. R. Vertiz
*Assistant Examiner*—Mark Bell
*Attorney, Agent, or Firm*—John C. Purdue

[57] ABSTRACT

A silicon-talc sealing material is disclosed. The sealing material is made up of about 15 to 30 percent by weight of silicon metal powder and about 85 to 70 percent by weight of talc. It has been found to be admirably suitable for sealing around the center wire of spark plugs in which the sealing material is subjected to temperatures of about 900° F. or higher. In such applications, the sealing material is unexpectedly advantageous by comparison with previously known materials, because it has significantly higher holding power, because it allows significantly less gas leakage, or because it has both advantages.

3 Claims, 3 Drawing Figures

SPARK PLUG SEAL

BACKGROUND OF THE INVENTION

Talc has been used extensively as a sealing material in the bore of ceramic spark plug insulators, as well as between the exterior of spark plug insulators and metal shells in which the insulator assemblies are supported. Since talc is an electrically non-conducting material, it must be packed around an electrical conductor when it is used to seal the bore of an insulator. In such service, it performs the dual function of preventing gas leakage through the insulator bore, and of locking the electrode which extends through the bore so that the electrode is not caused by the pressure to which it is subjected under service conditions to move longitudinally of the bore away from a cylinder within which it is installed. Talc alone, suggested, for example, as a sealing material of the type in question by U.S. Pat. Nos. 2,020,967 and 2,367,445, shows gradually decreased holding power under service conditions which subject it to temperatures in excess of about 900° F., as well as a significantly decreased ability to prevent gas leakage when subjected to temperatures in excess of about 1300° F.

Several spark plugs have also been found, believed to have been made by a German company, which had a seal in the upper part of the insulator bore containing talc, aluminum metal powder and silicon metal powder. The seal in one such plug contained 41 percent* talc, 40 percent aluminum metal powder and 19 percent silicon metal powder. To date, no patent or other publication disclosing this spark plug has been found. A seal made from talc, aluminum metal powder and silicon metal powder in the stated proportions has been produced, and has been tested. Such a seal has been found to be substantially equivalent to a seal made of talc, alone. It can be used satisfactorily to anchor a center electrode in the upper part of the bore of a spark plug insulator, and to prevent gas leakage when so positioned. The leakage of gas through such seals, however, increases catastrophically when the seals are operated under such service conditions that they reach a temperature of 1220° F. or higher, for example in the lower portion of an insulator bore; furthermore, at temperatures above about 1220° F. the aluminum-containing seal is virtually ineffective at anchoring the center electrode and the seal composed of talc alone exhibits a somewhat decreased effectiveness in this respect. U.S. Pat. No. 2,437,205 also suggests the use of either talc or a mixture of talc and comminuted metal to form such a seal, but does not indicate that the mixture has any advantage over talc.

*The terms "percent" and "parts" are used herein, and in the appended claims, to refer to percent and parts by weight, unless otherwise indicated.

BRIEF DESCRIPTION OF THE PRESENT INVENTION

The present invention is based upon the discovery of a seal which is a blend of about 15 to 30 percent of silicon metal powder with about 85 to 70 percent of talc. Such a seal has been found to be capable of withstanding operating temperatures as high as about 1500° F. without catastrophic increase in gas leakage, and to have an entirely satisfactory holding power when operated at even higher temperatures.

DETAILED DESCRIPTION OF THE INVENTION

Figure 1:
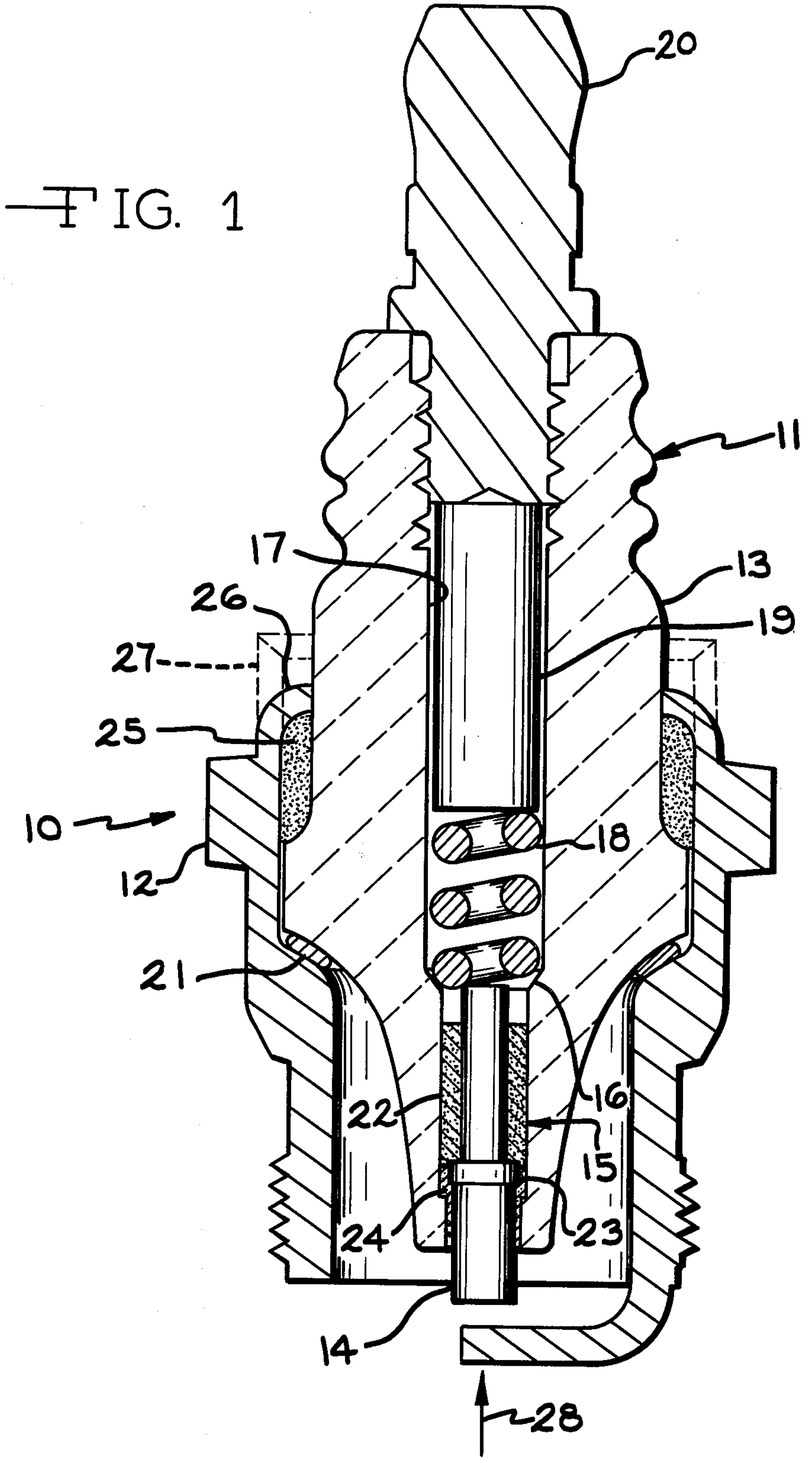
FIG. 1 is a view in vertical section of a spark plug which includes a silicon metal powder-talc seal according to the invention in the lower portion of the bore of its insulator.

As is indicated above, a sealing material according to the invention is merely a physical mixture of silicon metal powder and talc. Preferably, the silicon metal powder constitutes from about 15 percent to about 30 percent of the material, while talc constitutes from about 85 percent to about 70 percent. Most desirably, the composition is composed of substantially 23 percent of silicon metal powder and 77 percent of talc. As a practical matter, both the silicon metal powder and the talc are usually finer than 80 mesh, U.S. Sieve Series, preferably about 100 mesh and 325 mesh or finer, respectively, U.S. Sieve Series.

The sealing composition according to the invention can conveniently be prepared by slurrying talc in water, preferably deionized water, adding the requisite proportion of silicon metal powder, mixing and then spray drying the resulting slurry.

By way of example, a sealing material according to the invention was prepared by slurrying 27 parts talc in 27 parts water, adding 8 parts silicon metal powder, mixing for approximately thirty minutes, and then spray drying the slurry. The talc used was −325 mesh material, while the silicon metal powder was −100 mesh material. The spray dried material was then used to produce a seal in a spark plug indicated generally at 10 in FIG. 1. The spark plug 10 comprises an insulator assembly 11 mounted within a threaded shell 12. The insulator assembly 11 is made up of a ceramic insulator 13, a center electrode 14, a seal indicated generally at 15 for the electrode 14, a step 16 in a bore 17 of the insulator 13, a spring 18, a resistor 19 and a terminal 20.

The spark plug 10 is short in its longitudinal dimension, by comparison with automotive spark plugs, being intended for use in a small engine of the type used with chain saws. As a consequence of the shortness of the plug 10, and the presence therein of the resistor 19 and the spring 18, the seal 15 is close to the firing end of the electrode 14, being disposed substantially below a gasket 21 through which the insulator 13 is seated on an internal flange of the shell 12.

The seal 15 was produced by mounting the insulator 13 and the electrode 14 in a suitable jig where they were supported in the relative positions shown in FIG. 1. Silicon-talc sealing material produced as described above was then tamped as indicated at 22 into the annular space between the electrode 14 and the bore 17 of the insulator 13. A head 23 on the electrode 14 prevented the silicon-talc sealing material from entering the lower portion of the insulator bore 17 below the head 23 to any appreciable extent. After the silicon-talc sealing material 15 had been packed in place, the insulator and the then partially installed electrode 14 were removed from the jig, and a conventional firing end cement 24 was injected into the annular space between the insulator bore 17 and the electrode 14, substantially filling the portion of that annular space below the head 23. The insulator assembly 11 was then completed by placing the spring 18 and the resistor 19 in the bore 17 of the insulator 13, substantially as shown in FIG. 1, and then cementing and threading the terminal 20 to the upper portion of the insulator 13.

Assembly of the spark plug 10 was then completed by inserting the gasket 21 in the shell 12, placing the insulator assembly 11 on the gasket 21, and packing talc as indicated at 25 into the annular space between the exterior of the insulator 13 and the interior of the shell 12. During the performance of the steps just described, an inwardly turned lip 26 was extended substantially vertically upwardly as indicated by dotted lines designated 27 in FIG. 1. The assembly was then completed by deforming to form the lip 26 in engagement with the talc 25.

Figure 3:
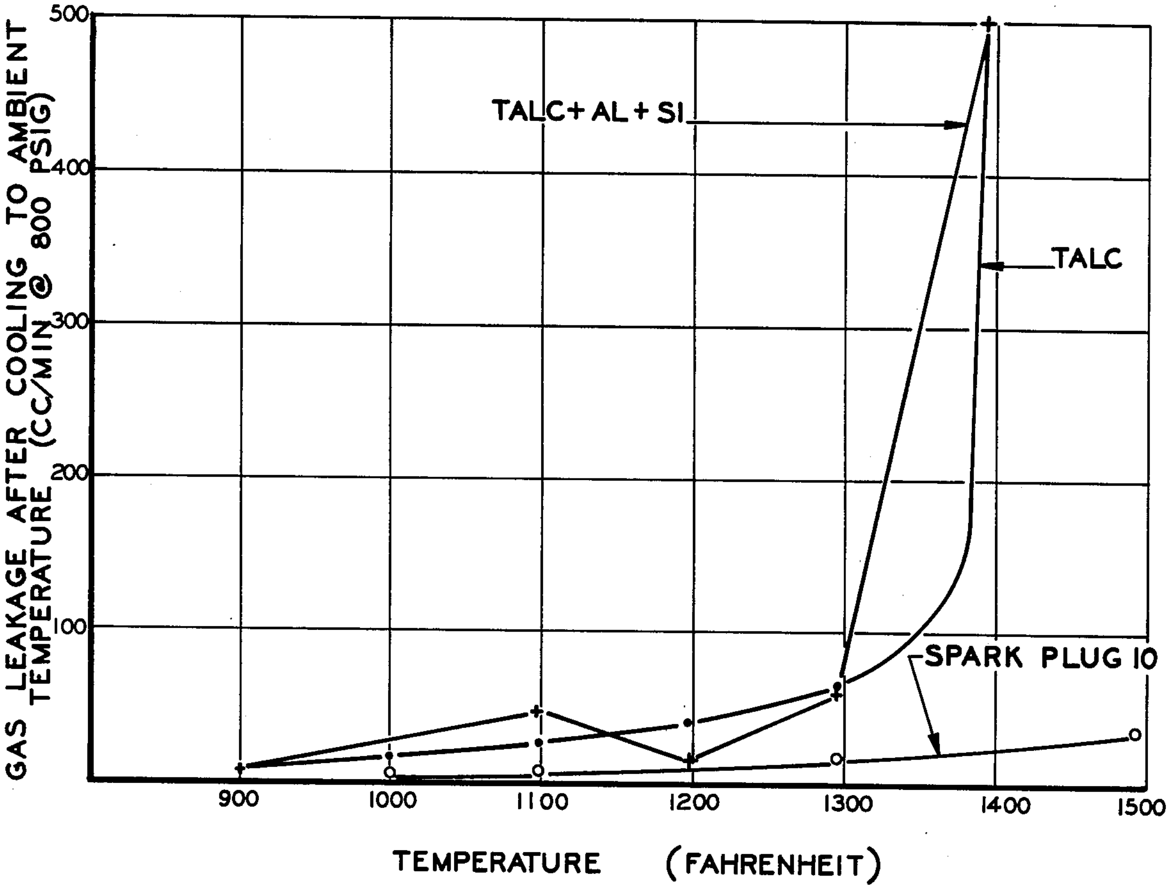
FIG. 3 is a plot similar to FIG. 2, but showing gas leakage as a function of temperature for the three sealing materials.

Several of the spark plugs 10 were then subjected to a gas leakage test which involved heating the plug for twenty-four hours at a predetermined temperature and cooling to ambient temperature. The shell 12 was then threaded into a pressurizable cylinder, and gas leakage of that plug was determined when the chamber was pressurized to 800 pounds per square inch gauge pressure. Gas leakage in cubic centimeters per minute for the plug 10 is plotted in FIG. 3, from which it will be noted that at temperatures as high as 1500° F. the leakage for the spark plug 10 at 800° pounds per square inch gauge pressure was only about 35 cubic centimeters per minute. This indicates that, insofar as leakage is concerned, the spark plug 10 is satisfactory for operation under all conditions that are likely to be encountered in service, even when the seal is close to the firing end, as is the plug 10.

For purposes of comparison, but not in accordance with the present invention, additional spark plugs identical with the plug 10, except that, in one instance, talc was substituted for the seal according to the present invention and, in another instance, a mixture of 41 percent talc, 40 percent aluminum and 19 percent silicon was substituted for the sealing material according to the invention. Spark plugs with the talc seal and spark plugs with the talc-aluminum-silicon seal were subjected to the gas leakage test described above, with the results plotted in FIG. 3. It will be noted that, after having been subjected to temperatures above 1300° F., the plugs with the talc seal and also the plugs with the talc-aluminum-silicon seal had undergone catastrophic failure, insofar as gas leakage is concerned.

Figure 2:
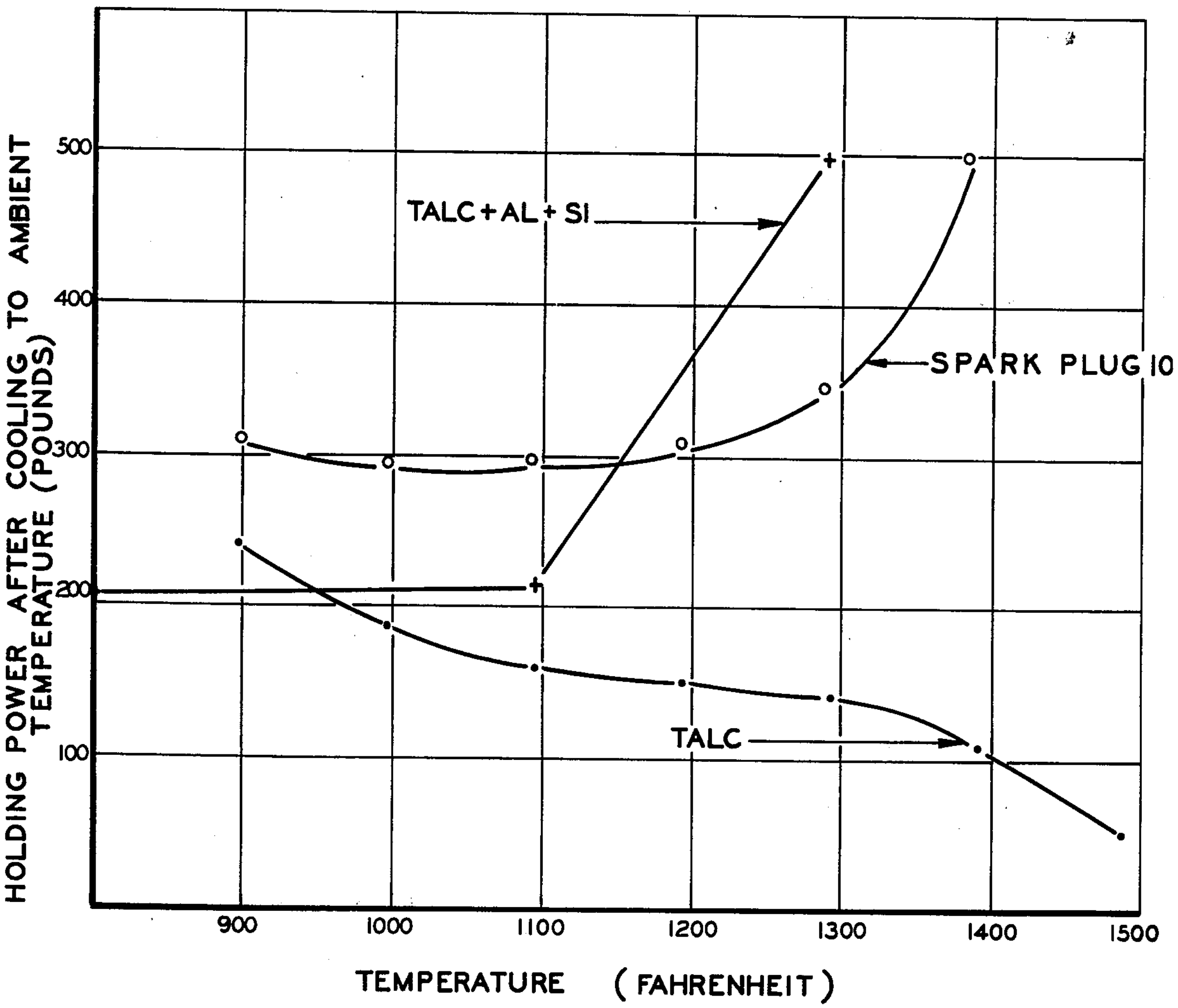
FIG. 2 is a plot showing holding power as a function of the temperature to which a talc seal had been heated and similar plots for seals (1) composed of talc, aluminum metal powder and silicon metal powder and (2) according to the present invention composed of silicon metal powder and talc.

Spark plugs 10 were also subjected to a different test to determine holding power of the seal 15. This test involved heating plugs to various temperatures, holding them at temperature for a period of twenty-four hours, allowing them to cool, removing the terminal 20, and then ascertaining the force in pounds, exerted in the direction of an arrow designated 28 in FIG. 1, required to move the electrode 14 relative to the insulator 3. The maximum force applied was 500 pounds. The results of this test are plotted in FIG. 2, from which it will be observed that a force of at least substantially 300 pounds was required to cause such movement of the electrode 14 in spark plugs 10 which had the seal according to the present invention after heating for twenty-four hours at temperatures ranging from 900° F. to 1400° F. For purposes of comparison, but not in accordance with the present invention, spark plugs similar to the plugs 10 were also produced, except that talc was used to produce the seal, rather than the sealing composition according to the present invention. The data for these spark plugs, after they had been subjected to the holding power test just described, are presented in FIG. 2, from which it will be observed that talc, alone, used as a sealing material, progressively loses holding power if subjected to elevated temperatures in simulated service. Spark plugs similar to the plugs 10, except that they contained the previously identified talc-aluminum-silicon seal were also produced and subjected to the holding power test. It will be apparent from the data plotted in FIG. 2 that this sealing material showed satisfactory holding power after cooling to room temperature; however, it has essentially no holding power while at temperatures above about 1100° F.*, and as previously noted, spark plugs with such a seal undergo a catastrophic failure insofar as gas leakage is concerned when subjected to temperatures above about 1300° F.

*Probably because of melting of the aluminum.

It will be apparent that various changes and modifications can be made from the details of the invention as specifically described herein without departing from the spirit and scope of the attached claims. For example, a seal according to the invention is shown in FIG. 1 in a short spark plug, but it can equally well be used in any other type of plug, being particularly significant in a plug where it is subjected to elevated temperatures, e.g., above about 1100° F.

What we claim is:

1. A spark plug sealing material consisting essentially of a mixture of from about 15 to 30 percent of silicon metal with from about 85 to 70 percent of talc.

2. A spark plug sealing material as claimed in claim 1 wherein the silicon metal constitutes about 23 percent and the talc about 77 percent of the material.

3. In a spark plug comprising an insulator assembly mounted in a metallic shell, which shell has means operable for engagement with an internal combustion engine, and means locking the insulator assembly and the shell into a spark plug, the insulator assembly comprising a ceramic insulator having a central bore, a center electrode in firing gap relationship with a ground electrode carried by the shell, a terminal, and means electrically connecting the electrode and the terminal, the improvement of a spark plug sealing material as claimed in claim 1 packed in an annular space between the exterior of the electrode and the interior of the insulator bore.

* * * * *